(12) United States Patent
Alberti et al.

(10) Patent No.: US 9,957,117 B2
(45) Date of Patent: May 1, 2018

(54) METHOD FOR TRANSFERRING ARTICLES

(71) Applicant: CT PACK S.r.l., Valsamoggia (Bologna) (IT)

(72) Inventors: Bruno Alberti, Lido di Pomposa (IT); Daniele Davi, Ferrara (IT); Daniele Mezzaro, Ferrara (IT)

(73) Assignee: CT PACK S.R.L., Valsamoggia (IT)

( * ) Notice: Subject to any disclaimer, the term of this patent is extended or adjusted under 35 U.S.C. 154(b) by 0 days. days.

(21) Appl. No.: 15/415,317

(22) Filed: Jan. 25, 2017

(65) Prior Publication Data
US 2017/0210572 A1 Jul. 27, 2017

(30) Foreign Application Priority Data

Jan. 27, 2016 (IT) .................. 102016000008378

(51) Int. Cl.
*B65G 47/90* (2006.01)
*B65G 47/91* (2006.01)
(Continued)

(52) U.S. Cl.
CPC ........... *B65G 47/914* (2013.01); *B65G 43/08* (2013.01); *B65G 47/244* (2013.01);
(Continued)

(58) Field of Classification Search
CPC .. B65G 47/244; B65G 47/902; B65G 47/905; B65G 47/907; B65G 47/914;
(Continued)

(56) References Cited

U.S. PATENT DOCUMENTS 5,921,375 A * 7/1999 van Laar ............... B65G 47/848
198/370.12
7,644,558 B1 * 1/2010 Fallas .................... B25J 9/0093
53/251
(Continued)

FOREIGN PATENT DOCUMENTS

| IT | 102016000008378 | * | 1/2016 |
| WO | WO2007079751 A1 | | 7/2007 |
| WO | WO2007093400 A1 | | 8/2007 |

OTHER PUBLICATIONS

Italian Search Report dated Sep. 22, 2016 from counterpart Italian App No. IT UB20160315.

*Primary Examiner* — Leslie A Nicholson, III
*Assistant Examiner* — Keith R Campbell
(74) *Attorney, Agent, or Firm* — Shuttleworth & Ingersoll, PLC; Timothy J. Klima

(57) ABSTRACT

A method for transferring articles comprises the steps of: preparing a plurality of articles to be transferred along a first conveyor belt movable along a feed direction, picking up the articles with a plurality of gripper heads movable along respective pickup axes, and releasing the articles into a releasing station. The step of picking up the articles comprises the sub-steps of: detecting given parameters of each of the articles by at least one detection and management unit positioned upstream of the plurality of gripper heads, identifying, for each of the rows, at least one homogeneous sub-group of articles based on the given parameters detected, and for each homogeneous sub-group, simultaneously picking up all the articles of the first homogeneous sub-group with a respective group of gripper heads.

20 Claims, 4 Drawing Sheets

(51) Int. Cl.
*B65G 47/244* (2006.01)
*B65G 43/08* (2006.01)
(52) U.S. Cl.
CPC ......... *B65G 47/917* (2013.01); *B65G 47/918* (2013.01); *B65G 2203/0233* (2013.01); *B65G 2203/041* (2013.01)
(58) Field of Classification Search
CPC .......... B65G 47/917; B65G 2811/0621; B65G 2811/0626; B65G 2811/0663; B65G 47/918; B65G 2201/0202; B65G 2203/0225; B65G 2203/0233; B65G 43/08
See application file for complete search history.

(56) References Cited

U.S. PATENT DOCUMENTS

| | | | |
|---|---|---|---|
| 7,762,382 B2 * | 7/2010 | Grundtvig | B65G 47/682 198/382 |
| 2012/0323357 A1 * | 12/2012 | Izumi | B25J 9/1697 700/228 |
| 2016/0083199 A1 * | 3/2016 | Nishizaka | B65G 47/905 414/567 |
| 2016/0243590 A1 * | 8/2016 | Crest | B25J 15/0057 |

* cited by examiner

METHOD FOR TRANSFERRING ARTICLES

This application claims priority to Italian Patent Application No. 102016000008378 filed Jan. 27, 2016, the entirety of which is incorporated by reference herein.

BACKGROUND OF THE INVENTION

This invention relates to a method for transferring articles.

More specifically, this invention relates to a method for transferring articles and which can be used to transfer food products in a packaging system.

Systems of this kind are generally equipped with gripper heads having suction cups which pick up one or more articles and place them in a packaging container.

The articles to be packaged are placed on conveyor belts in such a way that customary pickup devices (grippers) equipped with gripper head can pick the articles up when these are positioned under them at the gripper heads. The pickup devices which have captured the articles with their gripper heads are then moved towards a container in order to fill it.

The articles are usually fed in "ranks", that is to say, in rows.

In many cases, however, in most packaging systems, the articles are positioned on the conveyor belt in a relatively uncontrolled or erratic manner and this makes it difficult, if not impossible, for the gripper heads to pick up the articles simultaneously.

In effect, if the articles are not perfectly aligned and spaced from each other according to precise values, the recurrent risk is that the gripper head which should pick them up simultaneously is unable to capture them all correctly.

In other words, it is very difficult for all the articles in one row to be aligned precisely enough to allow them to be picked up by a single pickup device (or "gripper").

To pick up all the articles in one row, therefore, the user must resort to individual gripper actions, thus increasing the number of movements necessary, that is, the total pickup time, and consequently increasing the number of pickup devices needed to complete the operation.

SUMMARY OF THE INVENTION

In this context, the technical purpose which forms the basis of this invention is to propose a method for transferring articles that overcomes the above mentioned drawbacks of the prior art.

More specifically, the aim of this invention is to provide a method for transferring articles which is simple, effective and efficient and which allows improving the productivity of the transfer process.

A further aim of this invention is to provide a method for transferring articles which allows minimizing the number of movements of the pickup devices and speeding up the transfer process.

The technical purpose indicated and the aims specified are substantially achieved by a method for transferring articles comprising technical features as disclosed herein.

More specifically, this invention provides a method for transferring articles comprising the following steps:

preparing a plurality of articles to be transferred along a first conveyor belt movable along a feed direction, where the articles on the first conveyor are arranged substantially in rows oriented transversely to the feed direction, picking up the articles by means of a plurality of gripper heads movable along respective pickup axes, releasing the articles into a releasing station.

Advantageously, the step of picking up the articles comprises the following sub-steps:

detecting given parameters of each of the articles by means of at least one detection and management unit positioned upstream of the plurality of gripper heads, identifying, for each of the rows, at least one homogeneous sub-group of articles based on the given parameters detected, for each homogeneous sub-group, simultaneously picking up all the articles of the first homogeneous sub-group by means of a respective group of gripper heads.

Advantageously, therefore, the transfer method comprises analyzing/scanning each row of articles and formulating a purpose-specific pickup pattern to be able to optimize how many and which articles can be picked up simultaneously by one pickup unit at a given time.

The system determines homogeneous sub-groups of articles and creates an intelligent pattern of articles which, based on given parameters, can be considered homogeneous and able to be picked up simultaneously, thereby implementing a multiple pickup method which allows speeding up the pickup process.

The dependent claims, which are incorporated here by reference, correspond to different embodiments of the invention.

BRIEF DESCRIPTION OF THE DRAWINGS

Further features and advantages of the invention are more apparent in the non-limiting description which follows of a preferred but non-exclusive embodiment of a method for transferring articles, with reference to the accompanying drawings, in which.

DESCRIPTION OF THE PREFERRED EMBODIMENTS

Figure 1:
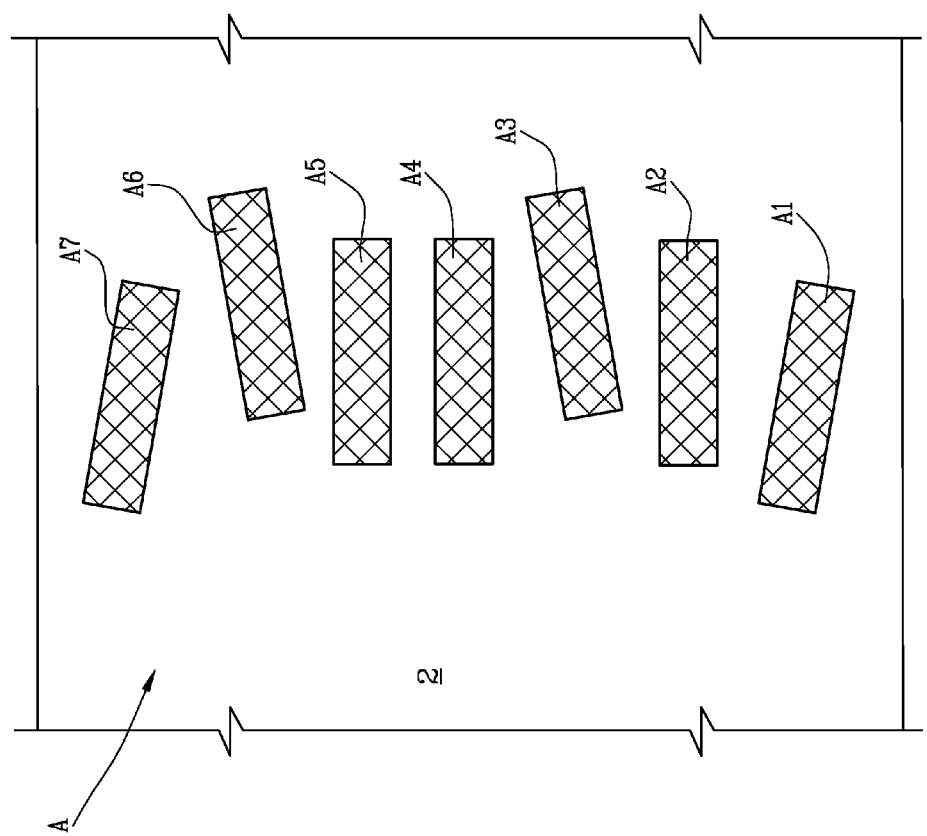
FIG. 1 illustrates a step of the method according to the invention, showing a distribution of articles belonging to one row positioned on a first conveyor belt.

With reference to the accompanying drawings, the reference character "A" generically denotes an article to be transferred, whilst the numeral 1 denotes in its entirety a system for transferring a plurality of articles A.

The method for transferring articles A according to this invention first of all comprises the step of preparing a plurality of articles A to be transferred along a first conveyor belt 2 movable along a feed direction X.

The articles A are arranged on the first conveyor belt 2 substantially in rows which are oriented transversely to the feed direction X.

FIG. 1 illustrates an example of how the articles A belonging to one row might be distributed on the first conveyor belt 2.

In the specific case shown, there are seven articles, labelled A1, A2, A3, A4, A5, A6, A7 for convenience of description.

As may be observed in FIG. 1, the articles A are not arranged regularly. In effect, as is often the case in transfer systems where the articles A are gravity fed from above, the articles A are not all aligned with each other or oriented uniformly, but are misaligned and not perfectly oriented.

The method comprises a step of picking up the articles A by means of a plurality of gripper heads 3 movable along respective pickup axes Z.

Advantageously, the step of picking up the articles A is carried out in sub-steps including, first of all, detecting given parameters of each of the articles A by means of at least one detection and management unit U positioned upstream of the plurality of gripper heads 3 (that is, upstream of the zone where the gripper heads 3 work).

In other terms, the articles A advancing along the feed direction X on the first conveyor belt 2 are made to pass by the detection and management unit U which detects and identifies the specified parameters.

Preferably, the sub-step of detecting given parameters of each article A comprises a step of determining at least one angular arrangement of the side walls of the article A relative to the feed direction X and/or the position of any point or feature of each article along the feed direction X.

Preferably, the sub-step of detecting given parameters of each article A comprises a step of determining at least one angular arrangement of the side walls of the article A relative to the feed direction X and/or the position of the geometrical center of each article along the feed direction X.

Preferably, the sub-step of detecting given parameters of each article A comprises a step of determining at least one angular arrangement of the side walls of the article A relative to the feed direction X and/or the position of the front edge of each article along the feed direction X.

Preferably, the step of detecting given parameters of each article A comprises a step of determining at least one angular arrangement of the side walls of the article A relative to the feed direction X and/or the position of a predetermined point or geometrical element of each article A along the feed direction X.

Preferably, the step of determining at least one angular arrangement of the side walls of the article A relative to the feed direction X and/or the position of any point or feature (preferably the geometrical center or the front edge) of each article along the feed direction X comprises a step of detecting the parameters by capturing at least one image of the articles (preferably by means of a vision device).

Thus, the detection and management unit U can process the data collected and advantageously identify the articles A positioned and oriented uniformly.

Preferably, the detection and management unit U comprises at least one of the following detection devices: video camera, sensor, encoder, scanner or photocell, capable of rapidly and effectively detecting the given parameter of each article A.

After the sub-step of detecting the given parameters of the articles A, the step of picking up the articles A advantageously comprises the sub-step of identifying, for each row of articles A, at least one homogeneous sub-group of articles based on the given parameters detected.

In other terms, the detection and management unit U is capable of analyzing the articles A and, using a suitable algorithm, working out which and how many articles are homogeneous with each other, thereby defining at least one homogeneous sub-group.

As will become clearer as this description continues, the term "homogeneous" is used herein to denote articles A which correspond to given parameters (of position and orientation) which are the same or similar (that is, all falling within predetermined tolerance intervals) and such that they can be easily picked up simultaneously by one group B, C, D of gripper heads 3.

In effect, thanks to this method, it is possible, for each homogeneous sub-group identified, to simultaneously pick up all the articles A of that homogeneous sub-group by means of a respective group B, C, D of gripper heads 3.

Once all the given parameters of the articles A have been determined, they are processed in order to identify the gripper unit 3 which is most suited to pick up the given articles A (and the movements it must perform to be able to pick them up correctly).

Preferably, the step of picking up the articles A comprises at least a first sub-step of simultaneously picking up all the articles A of a first homogeneous sub-group by means of a first group B of gripper heads 3 at least one subsequent sub-step of simultaneously picking all the articles A of a second homogeneous sub-group by means of a second group C of gripper heads 3.

It should be noted that because the articles are moving forward on the belt, the second group C of gripper heads 3 is, during the pickup action, downstream of the first group B relative to the feed direction X.

In other words, the region in which the second group C of gripper heads 3 operates is usually downstream of the region in which the first group B of gripper heads 3 operates.

The first and second groups B, C of gripper heads 3 belong to a single pickup and transfer unit 6 (as will become clearer as this description continues).

The detection and management unit U may thus advantageously manage the selective operation of one or more groups B, C, D of gripper heads 3 in such a way that these groups can pick up a respective homogeneous sub-group of articles A simultaneously or in succession as the articles A move forward on the first conveyor belt 2.

It should be noted that the homogeneous sub-group of articles A might correspond to all the articles A1-A7 and thus that the given parameters of all the articles A meet certain conditions so that all the articles A can be picked up simultaneously.

Alternatively, according to a possible aspect of the invention, at least one of the sub-groups of articles A might comprise a single article A which is picked up individually.

Advantageously, therefore, the method according to this invention allows making individual or multiple transfers (in successive sequences) based on the characteristics of the given parameters of the articles A detected and on the constructional characteristics of the pickup and transfer units 6.

Figure 2:
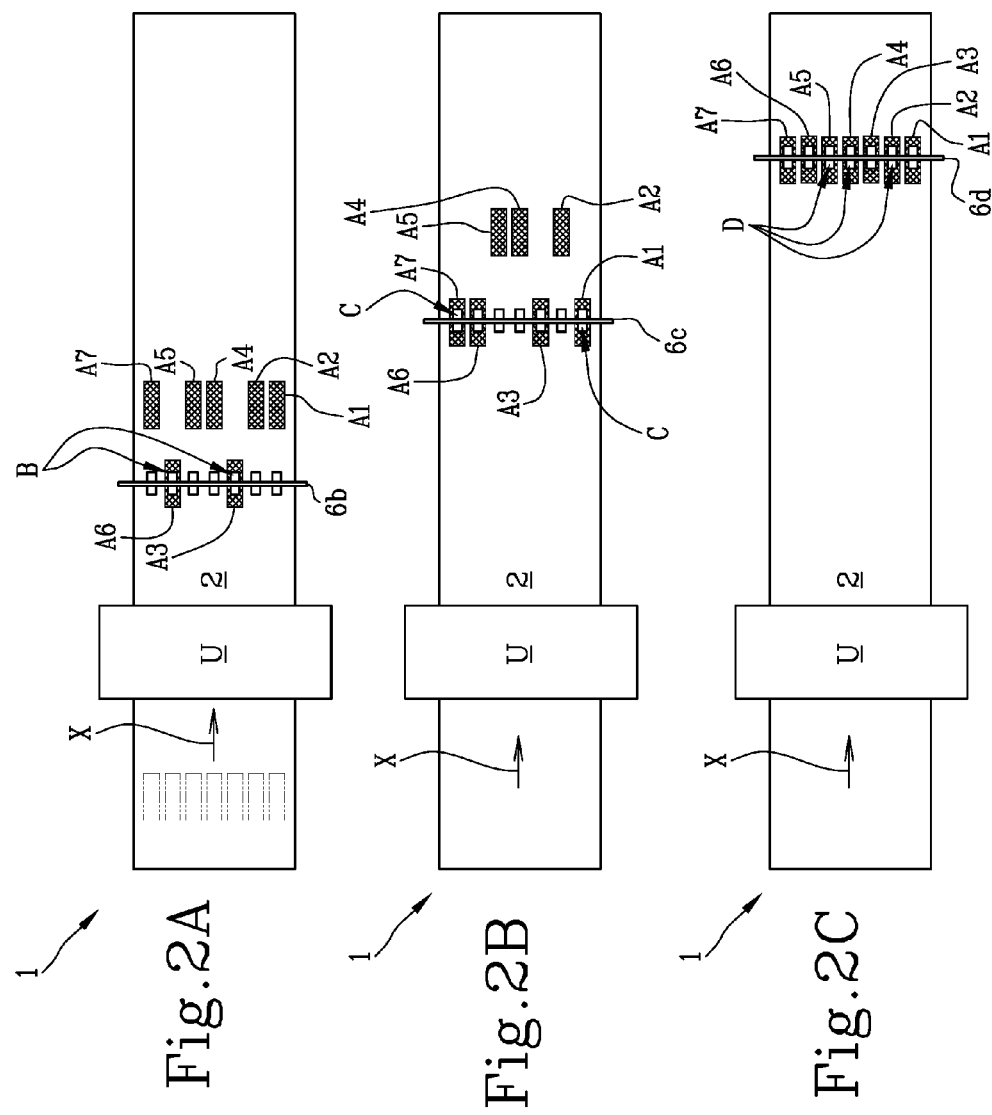
FIGS. 2A, 2B and 2C represent a possible succession of operating steps according to a first embodiment of the transfer method of this invention, schematically illustrating the step of picking up the articles of FIG. 1.

FIGS. 2A-2C schematically illustrate a part of an example of a system 1 showing the path of the articles A1-A7 of FIG. 1 along the first conveyor belt 2. Initially, the articles A1-A7, drawn with the dashed lines in FIG. 2A, are fed to the detection and management unit U which, after analyzing the specified parameters and creating the homogeneous sub-groups, is able to selectively drive the groups B, C, D of gripper heads 3 in order to pick them up.

It should be noted that the displacement of the articles along the belt between the different pickup steps in which the different pickup groups B, C and D operate is shown amplified in FIGS. 2A, 2B, 2C: more precisely, the pickup unit 6 follows the articles A along the belt to perform the multiple transfers along its working region, or operating region of the belt.

It should be noted that, as a function of the operating speed of the belt, the regions in which the different units 6b, 6c and 6d operate might also partly overlap.

It should be noted that the system advantageously comprises a control unit and means for detecting the position and orientation of each article, connected to the control unit.

The control unit controls and drives the gripper heads and is configured to implement the pickup logic described above.

The example of FIGS. 2A, 2B, 2C shows a single pickup and transfer unit 6.

In the example illustrated, the detection and management unit U has divided the seven articles A1-A7 into three homogeneous sub-groups: the first sub-group corresponding to the articles A3 and A6, the second sub-group corresponding to the articles A1 and A7, and the third sub-group corresponding to the articles A2, A4 and A5.

In effect, as shown in FIG. 1, the uniform parameters of the articles A1-A7 are such that the corresponding homogeneous sub-groups of articles cannot be picked up by the same group B-D of gripper heads 3.

Preferably, the parameters include alignment in the direction transverse to the feed direction and product spacing.

In this case, the detection and management unit U has determined that the easiest and quickest way, that is, the way which requires the smallest number of changes or adjustments (movements), to pick up all the articles A1-A7 is to pick up the first homogeneous sub-group A3, A6 at the zone 6b with the first group B of gripper heads, the second homogeneous sub-group A1, A7 at the second zone 6c with the second group C of gripper heads 3 and the third homogeneous sub-group A2, A4, A5 at the third zone 6d with the third group D of gripper heads 3.

It should be noted that at the end of the pickup step, all the articles have been picked up by the gripper heads 3, that is, each gripper head 3 is holding one article A.

Preferably, all the articles A are released simultaneously into a box 4.

Alternatively, the articles A might be released into a box 4 at different times.

As illustrated in FIG. 2A, the first group B of gripper heads 3 picks up only the articles A3 and A6, whilst the remaining articles A1, A2, A4, A5, A7 continue moving forward on the first conveyor belt 2 to be subsequently picked up by the second group C of gripper heads 3.

As illustrated in FIG. 2B, the second group C of gripper heads 3 picks up only the articles A1 and A7, whilst the remaining articles A2, A4, A5 continue moving forward on the first conveyor belt 2 to be picked up next by the third group D of gripper heads 3.

As illustrated in FIG. 2C, the third group D of gripper heads 3 picks up only the remaining articles A2, A4, A5.

At this point, all the articles in the row under consideration have been picked up.

The transfer method according to the invention also comprises the step of releasing the articles into a releasing station R (in particular, into a box 4 in transit or waiting at the releasing station R).

Figure 3:
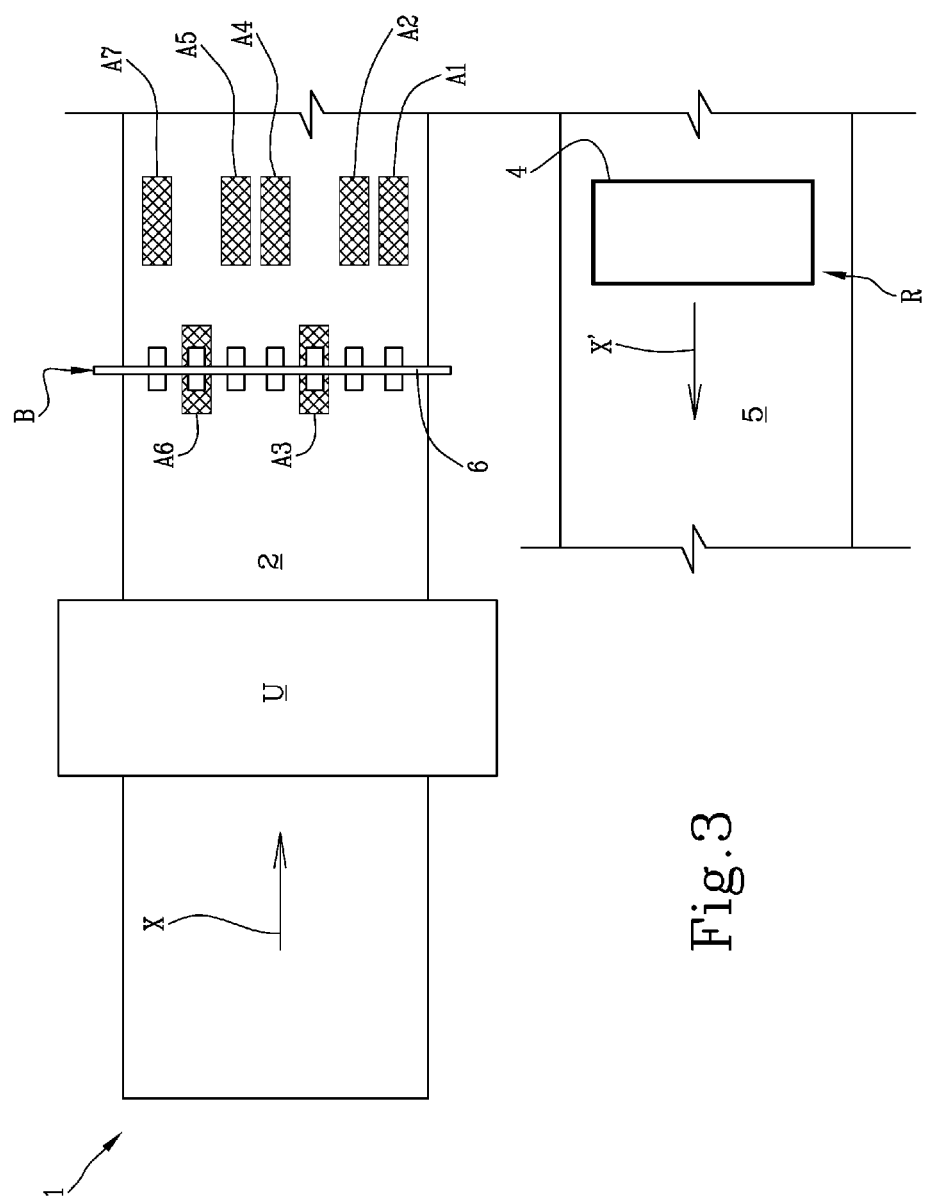
FIG. 3 illustrates a step of the transfer method of this invention, showing a conveyor line which transports the container for receiving the articles.

More specifically, after completing a step of picking up the articles A, each group B, C, D of gripper heads 3 is moved towards the releasing station R where it releases in controlled manner the articles A it previously picked up, as illustrated in FIG. 3.

In effect, the step of releasing the articles A into the releasing station R preferably comprises placing the plurality of articles A in a container 4 located on a second conveyor belt 5 movable along a feed direction X' preferably parallel to the feed direction X and, still more preferably, moving in the opposite direction.

Preferably, the step of simultaneously picking up all the articles A of a homogeneous sub-group comprises a sub-step of moving at least one gripper head 3 along an alignment direction Y at right angles to the pickup direction Z, in order to move two or more gripper heads 3 closer together or further apart, and/or a sub-step of rotating at least one gripper head 3 about an axis of rotation parallel to the pickup direction Z.

Preferably, the sub-step of rotating at least one gripper head 3 is accomplished by rotating the gripper head 3 about the respective pickup axis Z.

Preferably, the sub-step of rotating at least one gripper head 3 is accomplished by rotating a group B, C, D of gripper heads 3 as a block about an axis of rotation parallel to the pickup axes Z of each gripper head 3.

It should be noted that the sub-step of rotating at least one gripper head 3 comprises a step of rotating each gripper head individually about the pickup axes Z.

Advantageously, the higher is the number of degrees of freedom/movement of the individual gripper heads 3, the lower is the number of groups B, C, D needed to completely transfer the articles A in as little time as possible; in other terms, the more the movements/rotations a single group of grippers B, C, D can perform, the more the articles A which can be transferred simultaneously.

Figure 4:
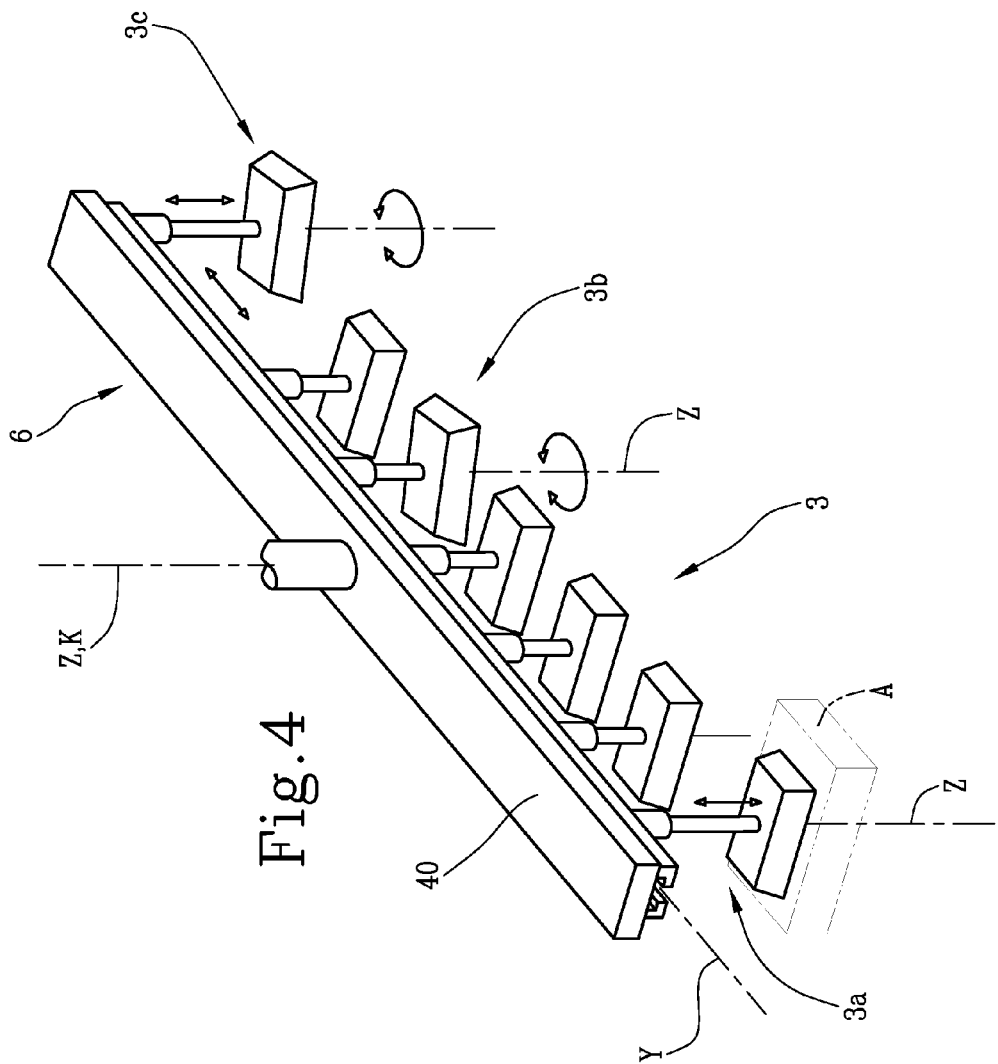
FIG. 4 shows an example embodiment of a group of gripper heads, schematically illustrating several possible combinations of movements of the gripper heads according to the invention.

FIG. 4 illustrates a possible embodiment of a pickup and transfer unit 6 comprising seven pickup heads 3 which can, as necessary, define one or more groups B, C, D of gripper heads 3 capable of picking up one or more homogeneous sub-groups of articles A.

FIG. 4 schematically shows the possible movements that can be performed by the gripper heads 3 according to possible embodiments thereof.

For example, the following are illustrated:

a gripper head 3a movable along the respective pickup direction Z to pick up or release an article A it has already captured, a gripper head 3b rotatable about an axis of rotation coinciding with the respective pickup direction Z, a gripper head 3c movable along the respective pickup direction Z and along the alignment direction Y and rotatable about an axis of rotation coinciding with the respective pickup direction Z and an axis of rotation K parallel to the pickup directions Z of the gripper heads 3, about which the groups B, C, D of gripper heads can be rotated as a block.

The pickup and transfer units 6 according to this invention can thus be provided with one or more gripper heads 3 capable of performing one or more movements/rotations.

Each gripper head 3 is provided with respective means, not illustrated, for gripping an article A. For example, the gripping means are means for holding an article A by suction and comprise one or more suction cups connected to a vacuum generating suction device, not illustrated. The vacuum generated allows the suction cup to hold the article in suspension.

Preferably, each gripper head 3 is movable relative to a supporting unit 40 on which they are mounted along a pickup direction Z for picking up an article A.

Preferably, each gripper head 3 is movable independently of the others along the pickup direction Z.

Preferably, each gripper head 3 is moved means of a linear actuator operating along the respective pickup direction Z.

In a possible embodiment of the transfer method according to the invention, the step of picking up the articles A comprises a first sub-step of simultaneously picking up all the articles A of a first homogeneous sub-group by means of a first group B, C, D of gripper heads 3 and a simultaneous sub-step of simultaneously picking all the articles A of a second homogeneous sub-group by means of a second group B, C, D of gripper heads 3.

In other terms, a first homogeneous sub-group of articles might be picked up at the same time as a second homogeneous sub-group of articles.

In effect, a pickup and management unit 6 might be capable of simultaneously picking up two or more homogeneous sub-groups of articles with different gripper heads 3, for example because it can rotate the gripper heads 3 about respective pickup directions Z and move the gripper heads 3 along the alignment direction Y.

For example, the articles A1, A4, A5 and A7 might be picked up simultaneously simply by first rotating the gripper heads 3 located at the articles A1 and A7 in such a way that they are aligned with the position of the articles A4 and A5.

Preferably, the step of moving and/or rotating at least one gripper head 3 is performed after the step of picking up a respective article A by the gripper head 3 and before the step of releasing the article A into the releasing station R.

In other terms, it is possible to modify the orientation and spatial position of the articles A after they have been picked up so that they can be drawn closer together and placed in a position suitable for packaging or packing in a box.

The invention achieves the preset aims by overcoming the disadvantages of the prior art and providing the user with an intelligent method for transferring articles A which analyses and checks their position and formulates a pickup pattern capable of optimizing the use of pickup and transfer units 6 and minimizing the movements of the pickup heads 3.

The method allows formulating the best possible mode of picking up the articles based on the characteristics (admissible movements and rotations) of the available gripper heads 3, on the number of available pickup and transfer units 6 and on the given parameters of (relative) position and/or orientation of the articles A to be picked up.

A suitable algorithm makes it possible to automatically determine which articles A can be picked up simultaneously with one pickup and transfer unit 6 and which can be picked up with other pickup and transfer units 6, thus optimizing the pickup process and finding the minimum number of multiple pickup actions which can be performed and how to perform them.

By identifying sub-groups of articles A which are homogeneous in terms of alignment and/or orientation, the invention advantageously allows reducing the number of robots needed to pick up the articles, with less redundancy in the transfer process (and hence less costs for the system) and improving the efficiency of the entire transfer process.

What is claimed is:

1. A method for transferring articles comprising steps as follows:
    providing a plurality of articles to be transferred along a first conveyor belt movable along a feed direction and placing the articles on the first conveyor belt arranged substantially in rows oriented transversely to the feed direction,
    picking up the articles with a plurality of gripper heads movable along respective pickup axes,
    releasing the articles into a releasing station,
    wherein the step of picking up the articles comprises sub-steps as follows:
        detecting at least one chosen from orientation and position parameters of each of the articles with at least one detection and management unit positioned upstream of the plurality of gripper heads,
        identifying, for each of the rows, at least one homogeneous sub-group of the articles based on the parameters detected,
        for the at least one homogeneous sub-group, simultaneously picking up all the articles of the at least one homogeneous sub-group with a respective group of gripper heads.

2. The method according to claim 1, wherein the step of simultaneously picking up all the articles of the at least one homogeneous sub-group comprises at least one chosen from a sub-step of moving at least one gripper head along an alignment direction at right angles to a pickup direction to move two or more gripper heads closer together or further apart and a sub-step of rotating at least one gripper head about an axis of rotation parallel to the pickup direction.

3. The method according to claim 2, wherein the sub-step of rotating at least one gripper head is accomplished by rotating the at least one gripper head about the respective pickup axis.

4. The method according to claim 2, wherein the sub-step of rotating at least one gripper head is accomplished by rotating the respective group of gripper heads as a block about an axis of rotation parallel to the respective pickup axes of each gripper head of the respective group of gripper heads.

5. The method according to claim 4, wherein the step of picking up the articles comprises a first sub-step of simultaneously picking up all the articles of a first homogeneous sub-group with a first group of gripper heads and a subsequent second sub-step of simultaneously picking up all the articles of a second homogeneous sub-group with a second group of gripper heads located downstream of the first group of gripper heads in the feed direction.

6. The method according to claim 4, wherein the step of picking up the articles comprises a first sub-step of simultaneously picking up all the articles of a first homogeneous sub-group with a first group of gripper heads and a simultaneous second sub-step of simultaneously picking all the articles of a second homogeneous sub-group with a second group of gripper heads.

7. The method according to claim 2, wherein the at least one chosen from the sub-step of moving the at least one gripper head and the sub-step of rotating the at least one gripper head is performed after picking up the articles with the gripper heads and before the step of releasing the articles into the releasing station.

8. The method according to claim 1, wherein the step of releasing the articles into the releasing station comprises releasing the articles into a container located on a second conveyor belt movable along a further feed direction substantially parallel to the feed direction.

9. The method according to claim 1, wherein the step of detecting at least one chosen from orientation and position parameters comprises a step of at least one chosen from determining at least one angular arrangement of side walls of each article relative to the feed direction and determining a position of a predetermined point or geometrical element of each article along the feed direction.

10. The method according to claim 1, wherein the at least one homogenous sub-group of the articles includes a sub-group comprising a single article.

11. The method according to claim 1, wherein the step of picking up the articles comprises a first sub-step of simultaneously picking up all the articles of a first homogeneous sub-group with a first group of gripper heads and a subsequent second sub-step of simultaneously picking up all the articles of a second homogeneous sub-group with a second group of gripper heads located downstream of the first group of gripper heads in the feed direction.

12. The method according to claim 1, wherein the step of picking up the articles comprises a first sub-step of simultaneously picking up all the articles of a first homogeneous sub-group with a first group of gripper heads and a simultaneous second sub-step of simultaneously picking all the articles of a second homogeneous sub-group with a second group of gripper heads.

13. The method according to claim 2, wherein the step of picking up the articles comprises a first sub-step of simultaneously picking up all the articles of a first homogeneous sub-group with a first group of gripper heads and a subsequent second sub-step of simultaneously picking up all the articles of a second homogeneous sub-group with a second group of gripper heads located downstream of the first group of gripper heads in the feed direction.

14. The method according to claim 2, wherein the step of picking up the articles comprises a first sub-step of simultaneously picking up all the articles of a first homogeneous sub-group with a first group of gripper heads and a simultaneous second sub-step of simultaneously picking all the articles of a second homogeneous sub-group with a second group of gripper heads.

15. The method according to claim 3, wherein the step of picking up the articles comprises a first sub-step of simultaneously picking up all the articles of a first homogeneous sub-group with a first group of gripper heads and a subsequent second sub-step of simultaneously picking up all the articles of a second homogeneous sub-group with a second group of gripper heads located downstream of the first group of gripper heads in the feed direction.

16. The method according to claim 3, wherein the step of picking up the articles comprises a first sub-step of simultaneously picking up all the articles of a first homogeneous sub-group with a first group of gripper heads and a simultaneous second sub-step of simultaneously picking all the articles of a second homogeneous sub-group with a second group of gripper heads.

17. The method according to claim 2, wherein the step of detecting at least one chosen from orientation and position parameters comprises a step of at least one chosen from determining at least one angular arrangement of side walls of each article relative to the feed direction and determining a position of a predetermined point or geometrical element of each article along the feed direction.

18. The method according to claim 11, wherein the step of detecting at least one chosen from orientation and position parameters comprises a step of at least one chosen from determining at least one angular arrangement of side walls of each article relative to the feed direction and determining a position of a predetermined point or geometrical element of each article along the feed direction.

19. The method according to claim 12, wherein the step of detecting at least one chosen from orientation and position parameters comprises a step of at least one chosen from determining at least one angular arrangement of side walls of each article relative to the feed direction and determining a position of a predetermined point or geometrical element of each article along the feed direction.

20. The method according to claim 1, wherein the plurality of gripper heads are aligned along an alignment direction perpendicular to the respective pickup axes.

* * * * *